United States Patent
Yu et al.

(10) Patent No.: US 12,222,607 B2
(45) Date of Patent: Feb. 11, 2025

(54) LIQUID CRYSTAL DISPLAY PANEL AND DISPLAY APPARATUS

(71) Applicant: BOE TECHNOLOGY GROUP CO., LTD., Beijing (CN)

(72) Inventors: Yong Yu, Beijing (CN); Shi Shu, Beijing (CN); Chuanxiang Xu, Beijing (CN); Yang Yue, Beijing (CN); Xiang Li, Beijing (CN); Shaohui Li, Beijing (CN); Ce Ning, Beijing (CN); Jinchao Zhang, Beijing (CN); Qi Yao, Beijing (CN); Lizhong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/024,004

(22) PCT Filed: May 27, 2022

(86) PCT No.: PCT/CN2022/095444
§ 371 (c)(1),
(2) Date: Feb. 28, 2023

(87) PCT Pub. No.: WO2023/225980
PCT Pub. Date: Nov. 30, 2023

(65) Prior Publication Data
US 2024/0280861 A1 Aug. 22, 2024

(51) Int. Cl.
*G02F 1/1339* (2006.01)
*G02F 1/1333* (2006.01)
(Continued)

(52) U.S. Cl.
CPC .... *G02F 1/13394* (2013.01); *G02F 1/133512* (2013.01); *G02F 1/134318* (2021.01);
(Continued)

(58) Field of Classification Search
CPC ............ G02F 1/1333; G02F 1/133345; G02F 1/133357; G02F 1/1335; G02F 1/133512;
(Continued)

(56) References Cited

U.S. PATENT DOCUMENTS

| | | | | |
|---|---|---|---|---|
| 2009/0115947 | A1* | 5/2009 | Huang | G02F 1/13394 349/191 |
| 2019/0196242 | A1* | 6/2019 | Nomura | G02F 1/1368 |

(Continued)

FOREIGN PATENT DOCUMENTS

| | | | | |
|---|---|---|---|---|
| CN | 103454815 A | * 12/2013 | | G02F 1/13394 |
| CN | 103529591 A | 1/2014 | | |

(Continued)

OTHER PUBLICATIONS

Patent Translate CN 103454815 (Dec. 18, 2013).*
Patent Translate CN 105807508 (Jul. 27, 2016).*

*Primary Examiner* — Thoi V Duong
(74) *Attorney, Agent, or Firm* — Nath, Goldberg & Meyer; Joshua B. Goldberg

(57) ABSTRACT

The disclosure provides a liquid crystal display panel and a display apparatus. The liquid crystal display panel of the disclosure includes: first and second substrates assembled to form a cell, a plurality of main spacers therebetween, and an auxiliary spacer around at least a portion of the main spacers. Height of the auxiliary spacer is greater than or equal to that of the main spacer. The display panel further includes: pillows on side of the first substrate close to the second substrate and each abutting against a corresponding main spacer. An orthographic projection of the main spacer on the first substrate falls within an orthographic projection of the pillow on the first substrate, and an orthographic projection of the auxiliary spacer on the first substrate does not overlap with the orthographic projection of the pillow on the first substrate.

17 Claims, 5 Drawing Sheets

(51) Int. Cl.
*G02F 1/1335* (2006.01)
*G02F 1/1343* (2006.01)
*G02F 1/1362* (2006.01)
*G02F 1/1368* (2006.01)

(52) U.S. Cl.
CPC .... *G02F 1/13439* (2013.01); *G02F 1/133357* (2021.01); *G02F 1/136227* (2013.01); *G02F 2201/123* (2013.01)

(58) Field of Classification Search
CPC .. G02F 1/1339; G02F 1/13394; G02F 1/1343; G02F 1/134318; G02F 1/13439; G02F 1/1362; G02F 1/136227; G02F 1/1368; G02F 2201/123
See application file for complete search history.

(56) References Cited

U.S. PATENT DOCUMENTS

2020/0152662 A1\* 5/2020 Chen .................. H01L 27/1248
2021/0356831 A1 11/2021 Liu et al.

FOREIGN PATENT DOCUMENTS

| CN | 105807508 A | \* | 7/2016 | ......... G02F 1/13394 |
|---|---|---|---|---|
| CN | 10609436 B | | 4/2019 | |
| CN | 109870855 A | | 6/2019 | |
| CN | 108646482 B | | 4/2021 | |
| CN | 113156717 A | | 7/2021 | |
| WO | 2021196784 A1 | | 7/2021 | |

\* cited by examiner

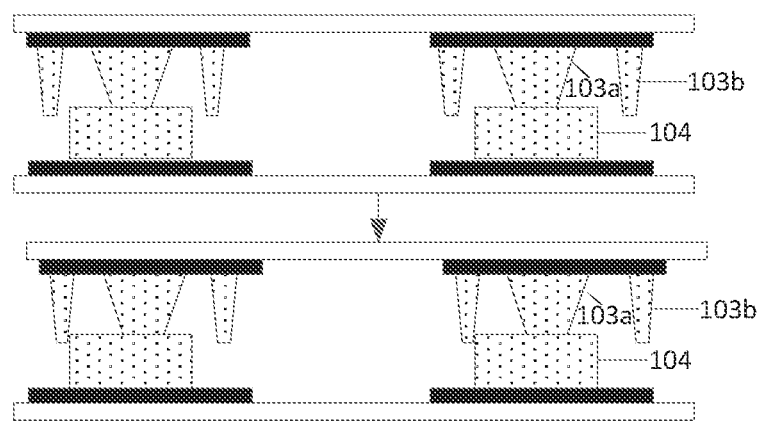
FIG. 9
| arrangement density of auxiliary spacers | support area ($\mu m^2$) | intensity of pressure ($mN/\mu m^2$) | aperture ratio of pixels |
|---|---|---|---|
| 1/64.5 | 338.1 | 0.834 | 40.34% |
| 1/21.4 | 1018.9 | 0.834 | 40.34% |
| 1/34 | 642.4 | 0.834 | 40.34% |
FIG. 10a
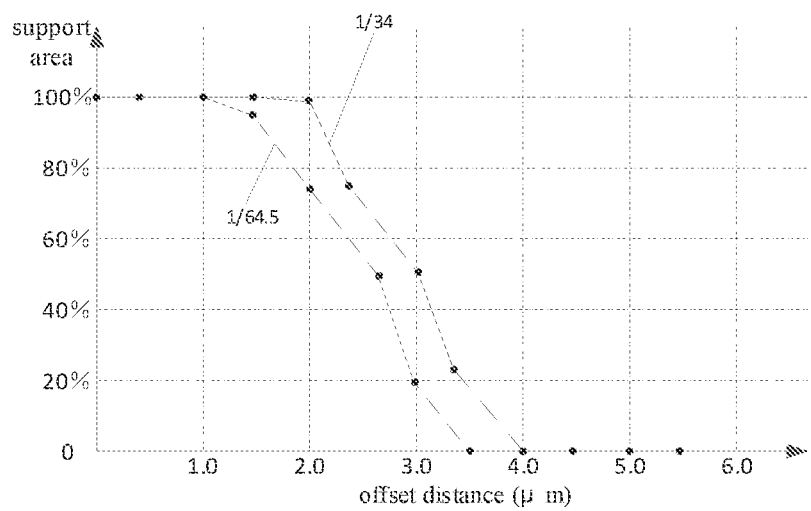
FIG. 10b

LIQUID CRYSTAL DISPLAY PANEL AND DISPLAY APPARATUS

This is a National Phase Application filed under 35 U.S.C. 371 as a national stage of PCT/CN2022/095444, filed May 27, 2022, the content of which is hereby incorporated by reference in its entirety.

TECHNICAL FIELD

The present disclosure relates to the field of display technology, and particularly relates to a liquid crystal display panel and a display apparatus.

BACKGROUND

A liquid crystal display (LCD) panel is popular among users due to its advantages of saving space, less heat generation, low power consumption, no radiation, etc. The liquid crystal display panel mainly includes an array substrate, a color filter substrate, a liquid crystal layer and so on. The liquid crystal layer is formed by filling liquid crystal between the color filter substrate and the array substrate. Generally, spacers are further disposed between the array substrate and the color filter substrate, and corresponding pillows for providing a platform for the spacers to stand on are further disposed on the array substrate side. The spacers and the pillows can support the array substrate and the color filter substrate to ensure a cell gap of the liquid crystal layer.

When the liquid crystal display panel is subjected to an external force, the spacers are easy to slide off the pillows and slide into a display region of the liquid crystal display panel. In this case, the spacers are likely to scratch display components in the display region, resulting in defects such as light leakage. In order to prevent the spacers from scratching the display components in the display region, the spacers in the liquid crystal display panel may be supplemented by increasing the number of the spacers. When some spacers slide off, the other spacers may support the array substrate and the color filter substrate to maintain the cell gap of the liquid crystal layer. However, for a large number of the spacers, a large number of light-shielding layers are required to shield them, which reduces an aperture ratio of the pixels in the liquid crystal display panel and affects the display effect.

SUMMARY

The present disclosure is directed to solving at least one of the technical problems of the related art and provides a liquid crystal display panel and a display apparatus.

In a first aspect, embodiments of the present disclosure provide a liquid crystal display panel, including: a first substrate and a second substrate assembled to form a cell, a plurality of main spacers between the first substrate and the second substrate, and an auxiliary spacer around at least a portion of the plurality of main spacers, wherein a height of the auxiliary spacer is greater than or equal to a height of each of the plurality of main spacers, the display panel further includes: a pillow on a side of the first substrate close to the second substrate and each abutting against a corresponding one of the plurality of main spacers, and an orthographic projection of the main spacer on the first substrate falls within an orthographic projection of a corresponding pillow on the first substrate, and an orthographic projection of the auxiliary spacer on the first substrate does not overlap with the orthographic projection of the pillow on the first substrate.

Optionally, a distance between an edge of the auxiliary spacer and an edge of the pillow is smaller than or equal to a distance between an edge of the main spacer and the edge of the pillow.

Optionally, the liquid crystal display panel includes a plurality of auxiliary spacers, and every two of the plurality of auxiliary spacers are on opposite sides of the main spacer and on a same straight line as a center of the main spacer.

Optionally, an area of the orthographic projection of the auxiliary spacer on the first substrate is smaller than an area of the orthographic projection of the main spacer on the first substrate.

Optionally, an arrangement density of the auxiliary spacer is smaller than or equal to an arrangement density of the plurality of main spacers.

Optionally, the first substrate includes a first base, and the liquid crystal display panel further includes a light-shielding layer on the first base; and orthographic projections of both the main spacer and the auxiliary spacer on the first base fall within an orthographic projection of the light-shielding layer on the first base.

Optionally, the first substrate further includes a driving circuit layer, a planarization layer and a pixel electrode sequentially disposed on a side of the light-shielding layer away from the first base; the pixel electrode is electrically coupled to the driving circuit layer through a via hole penetrating through the planarization layer; and the planarization layer is provided with a recess formed in the via hole, and the pillow is embedded in the recess.

Optionally, the driving circuit layer includes a plurality of thin film transistors; the thin film transistor includes a semiconductor layer; and an orthographic projection of the semiconductor layer on the first base falls within the orthographic projection of the light-shielding layer on the first base.

Optionally, the first substrate further includes: a passivation layer and a common electrode sequentially disposed on a side of the pixel electrode away from the first base; the common electrode has a plurality of slits; and an orthographic projection of the common electrode on the first base at least partially overlaps with an orthographic projection of the pixel electrode on the first base.

Optionally, the second substrate includes: a second base and a black matrix on a side of the second base close to the first base; and orthographic projections of both the main spacer and the auxiliary spacer on the second base fall within an orthographic projection of the black matrix on the second base.

Optionally, a distance between an edge of the black matrix and an edge of the auxiliary spacer is greater than or equal to 0.9 μm.

Optionally, a cross-section of the main spacer along a direction perpendicular to the second base has a rectangular or trapezoidal shape.

Optionally, the main spacer has a slope angle in a range from 60 to 90 degrees.

Optionally, a cross-section of the pillow in a direction perpendicular to the first base has a rectangle or a trapezoid shape.

Optionally, the pillow has a slope angle in a range from 90 to 100 degrees.

Optionally, the main spacer has an elastic recovery rate of 45% or more.

In a second aspect, embodiments of the present disclosure provide a display apparatus, including the liquid crystal display panel described above.

Optionally, the display apparatus is an augmented reality display apparatus or a virtual reality display apparatus.

Optionally, a pixel resolution of the augmented reality display apparatus or the virtual reality display apparatus is greater than or equal to 2000 PPI.

BRIEF DESCRIPTION OF DRAWINGS

FIG. 9 is a schematic diagram illustrating the liquid crystal display panel shown in FIG. 8 being misaligned by an external force;

FIG. 10a is a schematic diagram illustrating an influence of main spacers and auxiliary spacers on an aperture ratio of the pixel units in a liquid crystal display according to an embodiment of the present disclosure; and FIG. 10b is a schematic diagram illustrating an effect of the main spacers and the auxiliary spacers supporting the pixel units in a liquid crystal display according to an embodiment of the present disclosure.

DETAIL DESCRIPTION OF EMBODIMENTS

In order to enable one of ordinary skill in the art to better understand the technical solutions of the present disclosure, the present disclosure will be described in further detail with reference to the accompanying drawings and the specific embodiments.

Unless defined otherwise, technical or scientific terms used herein shall have the ordinary meanings as understood by one of ordinary skill in the art to which the present disclosure belongs. The term "first", "second", or the like used in the present disclosure is not intended to indicate any order, quantity, or importance, but rather is used to distinguish one element from another. Also, the term "a", "an", "the" or similar referent does not denote a limitation of quantity, but rather denote the presence of at least one. The word "comprise", "include", or the like, means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The term "upper", "lower", "left", "right", or the like is used only to indicate relative positional relationship, and when an absolute position of the object being described is changed, the relative positional relationship may also be changed accordingly.

Figure 1:
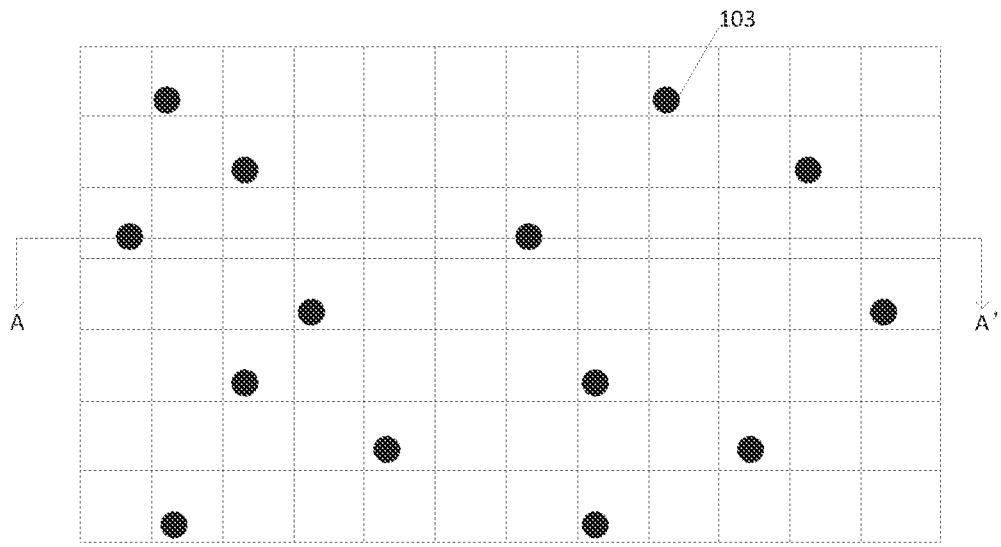
FIG. 1 is a schematic plan view of an exemplary liquid crystal display panel.
Figure 2:
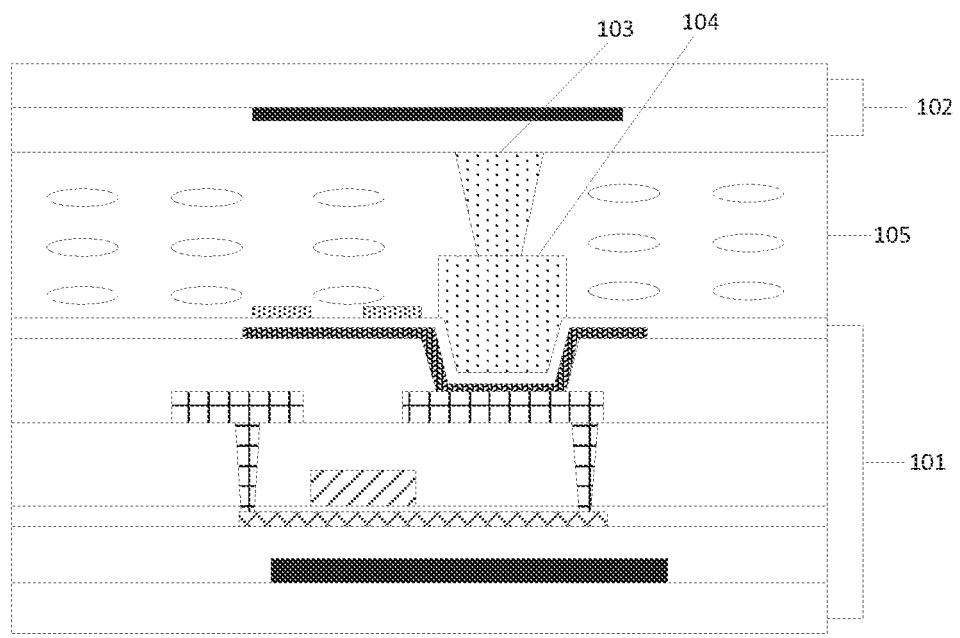
FIG. 2 is a schematic cross-sectional view of the liquid crystal display panel shown in FIG. 1 along A-A' direction.

FIG. 1 is a schematic plan view of an exemplary liquid crystal display panel, and FIG. 2 is a schematic sectional view of the liquid crystal display panel shown in FIG. 1, taken along A-A' direction. As shown in FIGS. 1 and 2, the liquid crystal display panel includes: a first substrate 101 and a second substrate 102 assembled to form a cell, a plurality of spacers 103 between the first substrate 101 and the second substrate 102, and pillows 104 on a side of the first substrate 101 close to the second substrate 102 and abutting against the corresponding spacers 103. Generally, the first substrate 101 may be an array substrate, the second substrate 102 may be a color filter substrate, and a liquid crystal layer 105 formed by liquid crystal molecules is further disposed between the array substrate and the color filter substrate.

When a driving voltage is input into the array substrate, a driving electric field is formed to drive the liquid crystal molecules in the liquid crystal layer 105 to deflect, so that a backlight is transmitted through the liquid crystal layer 105. Color filters are disposed in the color filter substrate, and may filter the backlight transmitted through the liquid crystal layer 105 into monochromatic light of different colors, such as red light, green light, blue light, or the like, thereby realizing color display.

Figure 3:
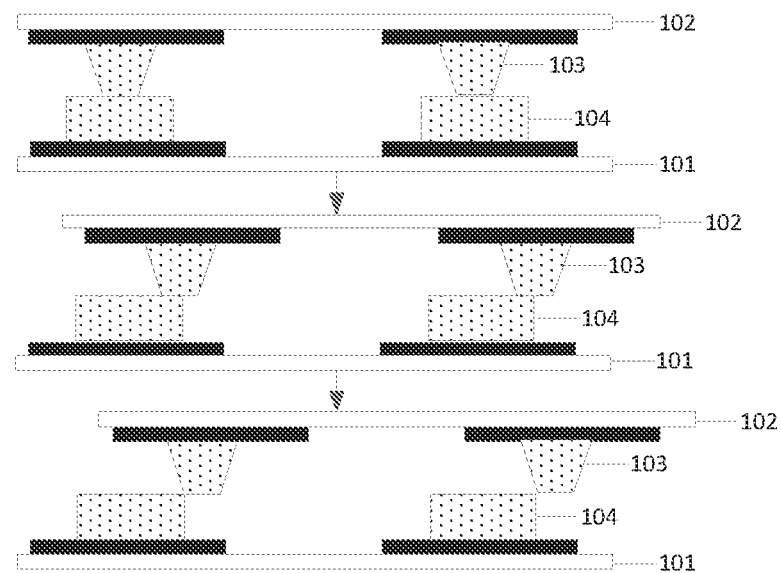
FIG. 3 is a schematic diagram illustrating the liquid crystal display panel shown in FIG. 2 being misaligned by an external force.

FIG. 3 is a schematic diagram illustrating the liquid crystal display panel shown in FIG. 2 being misaligned by an external force. As shown in FIG. 3, when the liquid crystal display panel is subjected to an external force, misalignment may occur between the array substrate and the color filter substrate in the liquid crystal display panel. As a result, the spacer 103 between the array substrate and the color filter substrate is easy to slide on the pillow 104, and even slide from the pillow 104 into the display region, and thus the display components in the display region are easy to be scratched, resulting in poor display such as light leakage.

In order to avoid the spacers 103 from sliding off the pillows 104 to the display region, at present, the spacers 103 in the liquid crystal display panel may be supplemented by increasing the number of the spacers 103.

Figure 4:
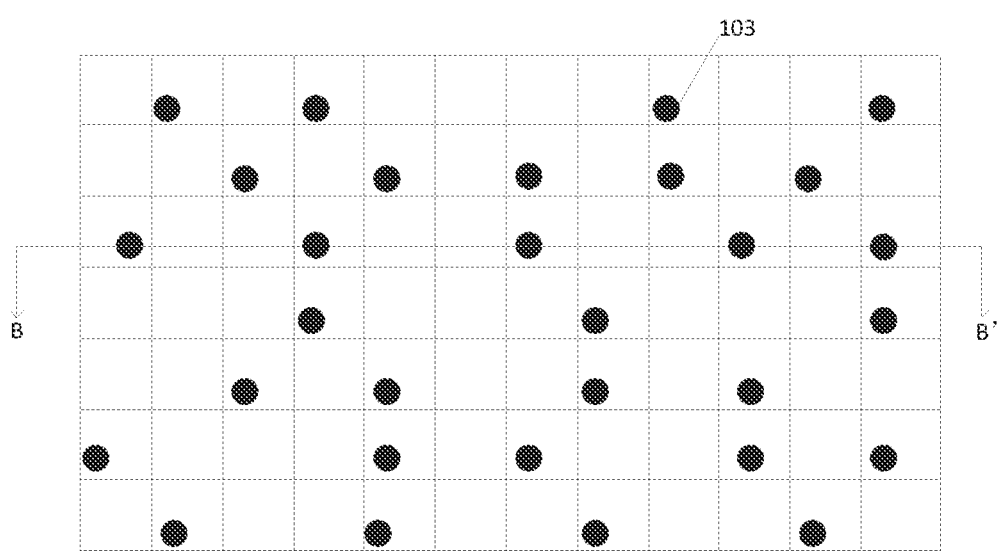
FIG. 4 is a schematic plan view of another exemplary liquid crystal display panel.
Figure 5:
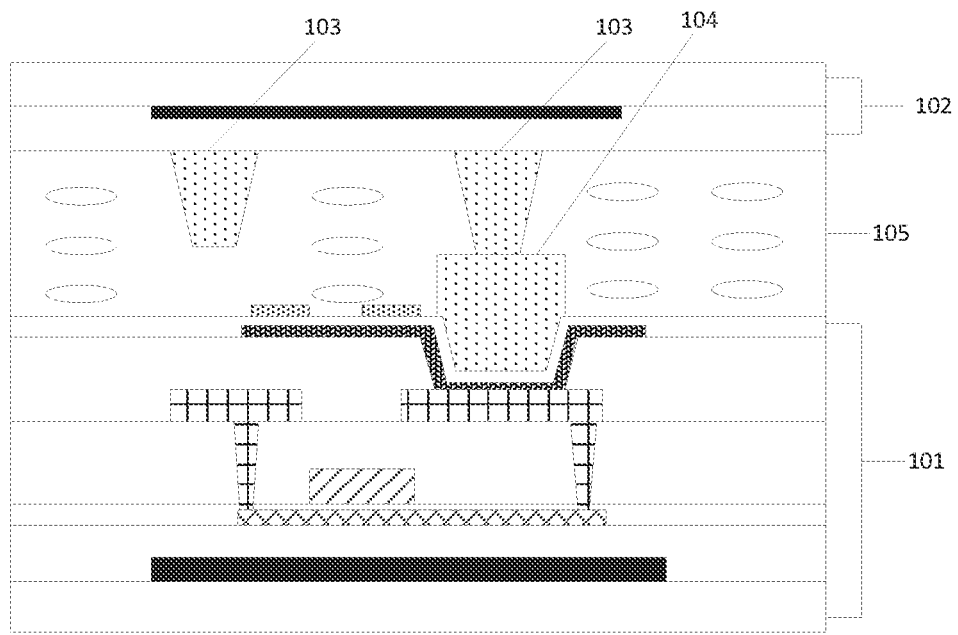
FIG. 5 is a schematic cross-sectional view of the liquid crystal display panel shown in FIG. 4 along B-B' direction.

FIG. 4 is a schematic plan view of another exemplary liquid crystal display panel, and FIG. 5 is a schematic cross-sectional view of the liquid crystal display panel shown in FIG. 4 along B-B' direction. As shown in FIGS. 4 and 5, the liquid crystal display panel is different from the liquid crystal display panel described above in that the number of spacers 103 is greater in the liquid crystal display panels shown in FIGS. 4 and 5.

Figure 6:
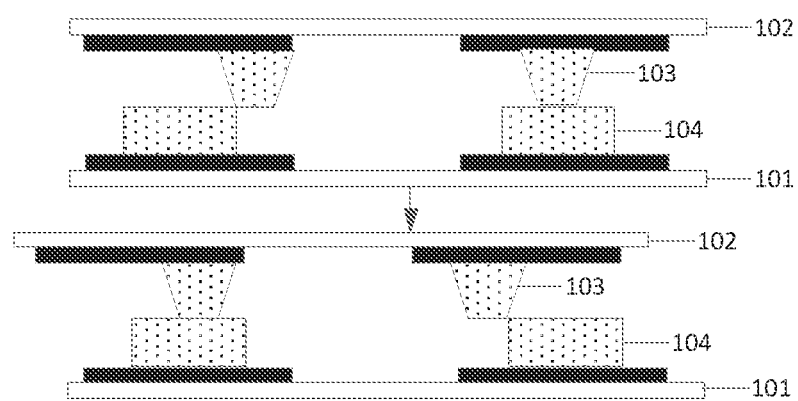
FIG. 6 is a schematic diagram illustrating the liquid crystal display panel shown in FIG. 5 being misaligned by an external force.

FIG. 6 is a schematic diagram illustrating the liquid crystal display panel shown in FIG. 5 being misaligned by an external force. As shown in FIG. 6, in a normal condition, only a part of the spacers 103 in the liquid crystal display panel may function as a support, and the rest of the spacers are suspended and only play an auxiliary role. When the liquid crystal display panel is subjected to an external force, the array substrate and the color filter substrate in the liquid crystal display panel are misaligned, causing the spacers 103 between the array substrate and the color filter substrate to easily slide on the pillow 104, and in this case, the spacers 103 originally function as a support may slide off the pillow 104, but the spacers 103 originally in the suspended state may slide onto the pillows 104, allowing for sufficient support area of the spacers 103 to ensure the cell gap of the liquid crystal layer 105.

In practical applications, at the portion of the liquid crystal display panel where the spacers 103 are located, since liquid crystal molecules cannot be filled, the display function cannot be realized by controlling the deflection of the liquid crystal molecules, and the light-shielding layer 106 is required to shield the spacers 103, so as to ensure the overall display effect of the liquid crystal display panel. However, a large number of light-shielding layers 106 are required due to a large number of the spacers 103, which reduces the aperture ratio of the pixels in the liquid crystal display panel and affects the display effect.

In order to solve at least one of the above technical problems, embodiments of the present disclosure provide a liquid crystal display panel and a display apparatus, and the liquid crystal display panel and the display apparatus according to embodiments of the present disclosure will be described in further detail with reference to the accompanying drawings and the detailed description.

Figure 7:
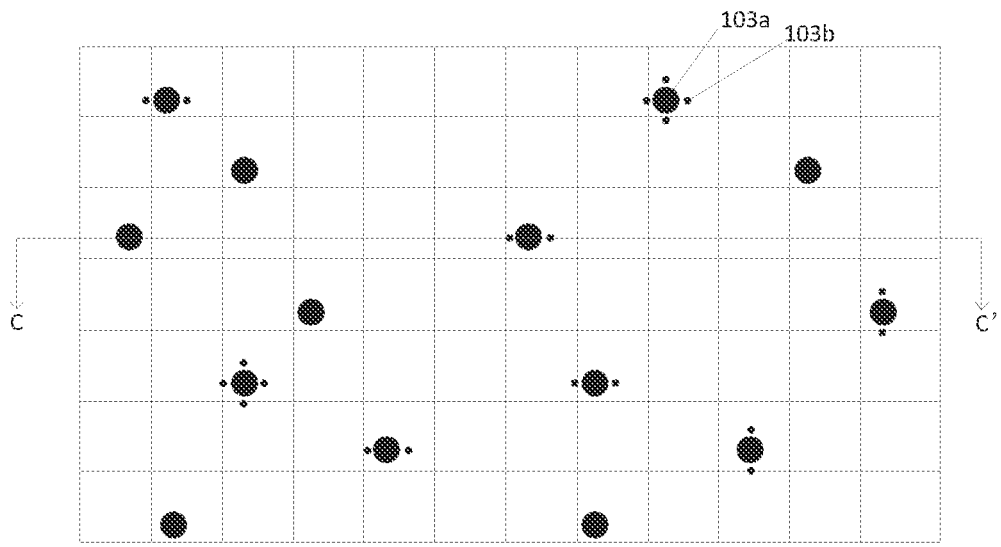
FIG. 7 is a schematic plan view of a liquid crystal display panel according to an embodiment of the present disclosure.
Figure 8:
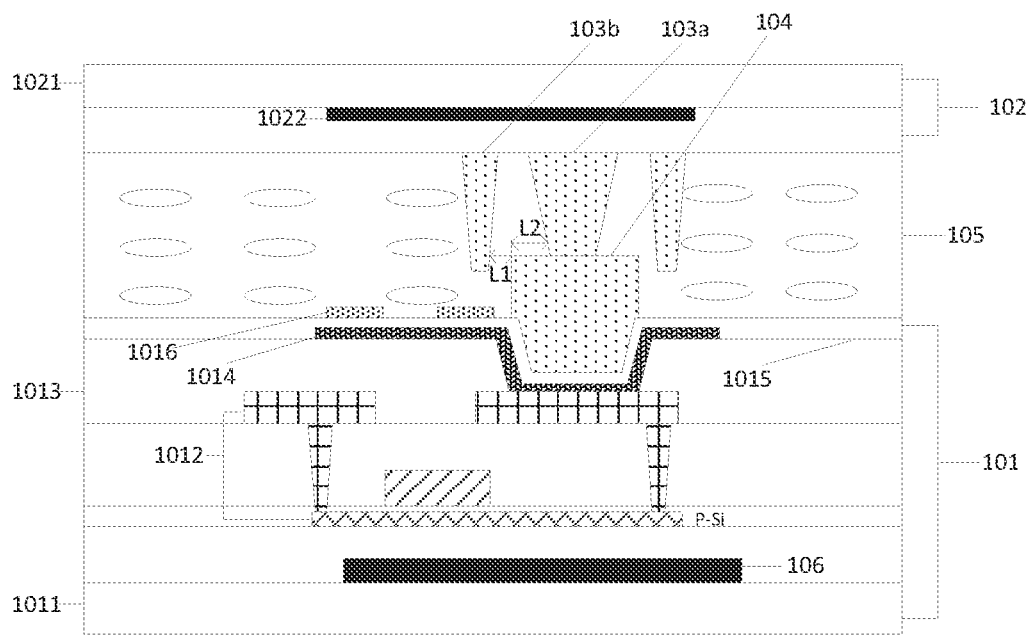
FIG. 8 is a schematic cross-sectional view of the liquid crystal display panel shown in FIG. 7 along C-C' direction.

In a first aspect, an embodiment of the present disclosure provides a liquid crystal display panel. FIG. 7 is a schematic plan view of a liquid crystal display panel according to an embodiment of the present disclosure, and FIG. 8 is a schematic cross-sectional view of the liquid crystal display panel shown in FIG. 7 along C-C' direction. As shown in FIG. 7 and FIG. 8, the liquid crystal display panel includes: a first substrate 101 and a second substrate 102 assembled to form a cell, a plurality of main spacers 103a between the first substrate and the second substrate 102, and an auxiliary spacer 103b around at least a portion of the main spacers 103a. A height of the auxiliary spacer 103b is greater than or equal to a height of the main spacer 103a. The display panel further includes: pillows 104 on a side of the first substrate 101 close to the second substrate 102 and each abutting against the corresponding main spacer 103a. An orthographic projection of the main spacer 103a on the first substrate 101 falls within an orthographic projection of the pillow 104 on the first substrate 101; and an orthographic projection of the auxiliary spacer 103b on the first substrate 101 does not overlap with the orthographic projection of the pillow 104 on the first substrate 101.

It should be noted that the first substrate 101 may be an array substrate, the second substrate 102 may be a color filter substrate, and a liquid crystal layer 105 formed by liquid crystal molecules is further disposed between the array substrate and the color filter substrate. When a driving voltage is input into the array substrate, a driving electric field is formed to drive the liquid crystal molecules in the liquid crystal layer 105 to deflect, so that backlight transmits through the liquid crystal layer 105. Color filters are disposed in the color filter substrate, and may filter the backlight transmitting through the liquid crystal layer 105 into monochromatic light of different colors, such as red light, green light, blue light, or the like, thereby realizing color display.

The main spacer 103a and the auxiliary spacer 103b may be made of the same material, and specifically, may be made of an organic material having a certain hardness, such as polyacrylic resin or polyester resin. The main spacer 103a and the auxiliary spacer 103b may effectively support the array substrate and the color filter substrate. In addition, when the liquid crystal display panel is subjected to an external force, the main spacer 103a may be deformed to relieve the stress, so as to prevent the main spacer 103a and other structures from damaging the array substrate and the color filter substrate. Correspondingly, the pillow 104 may also be made of the same material as the main spacer 103a and the auxiliary spacer 103b. The pillow 104 may abut against the corresponding main spacer 103a, may provide a relatively flat platform for the main spacer 103a to stand, and may maintain the cell gap of the liquid crystal layer 105 in the liquid crystal display panel together with the main spacer 103a.

FIG. 9 is a schematic diagram illustrating the liquid crystal display panel shown in FIG. 8 being misaligned by an external force. As shown in FIG. 9, in a normal condition, only the main spacers 103a of the liquid crystal display panel abut against the pillows 104 and have a support function, and there are no pillows 104 at positions corresponding to the auxiliary spacers 103b, and the auxiliary spacers 103b are in a suspended state. Meanwhile, a height of the auxiliary spacer 103b is greater than or equal to a height of the main spacer 103a, and the orthographic projection of the main spacer 103a on the first substrate 101 falls within the orthographic projection of the pillow 104 on the first substrate 101; the orthographic projection of the auxiliary spacer 103b on the first substrate 101 does not overlap with the orthographic projection of the pillow 104 on the first substrate 101, and each pillow 104 may be defined in an region enclosed by the auxiliary spacers 103b. When the liquid crystal display panel is subjected to an external force, the array substrate and the color filter substrate in the liquid crystal display panel are misaligned, resulting in that the main spacer 103a between the array substrate and the color filter substrate is easy to slide on the pillow 104. However, because of the existence of the auxiliary spacer 103b having a relatively high height, the side wall of the auxiliary spacer 103b may abut against the pillow 104 during the movement of the main spacer 103a, so that the distance by which the main spacer 103a slides is limited, which prevents the main spacer 103a from sliding from the pillow 104 to the display region, and prevents the display components in the display region from being scratched by the main spacer 103a to cause poor display such as light leakage. As such, a large number of light-shielding layers 106 are not required to shield the main spacers 103a, and the aperture ratio of pixels in the liquid crystal display panel can be improved, thereby improving the display effect. Meanwhile, the main spacer 103a may be defined in a region enclosed by the auxiliary spacers 103b, to prevent the main spacer 103a from sliding off the pillow 104, which can ensure that the main spacer 103a has a large support area, and that the main spacer 103a has a good support performance, so as to ensure the cell gap of the liquid crystal layer 105 in the liquid crystal display panel.

In some embodiments, as shown in FIG. 9, a distance between an edge of the auxiliary spacer 103b and an edge of the pillow 104 is smaller than or equal to a distance between an edge of the main spacer 103a and the edge of the pillow 104.

In FIG. 8, the distance between the edge of the auxiliary spacer 103b and the edge of the pillow 104 may be denoted as 'L1', and the distance between the edge of the main spacer 103a and the edge of the pillow 104 may be denoted as 'L2'. When the liquid crystal display panel is subjected to an external force, misalignment may occur between the array substrate and the color filter substrate in the liquid crystal display panel, the maximum distance that the auxiliary spacer 103b moves is equal to L1, the sidewall of the auxiliary spacer 103b may abut against the pillow 104 during the movement to define the maximum distance that the main spacer 103a slides (or moves) to L2. Since L1 is smaller than or equal to L2, the main spacer 103a may be defined in the region enclosed by the auxiliary spacers 103b, so as to prevent the main spacer 103a from sliding from the pillow 104 to the display region, and prevent the display components in the display region from being scratched by the main spacer 103a to cause poor display such as light leakage. As such, a large number of light-shielding layers 106 are not required to shield the main spacers 103a, and the aperture ratio of pixels in the liquid crystal display panel can be improved, thereby improving the display effect. Meanwhile, the main spacer 103a may be defined in the region enclosed by the auxiliary spacers 103b, to prevent the main spacer 103a from sliding off the pillow 104, which can ensure that the main spacer 103a has a large support area, and that the main spacer 103a has a good support performance, so as to ensure the cell gap of the liquid crystal layer 105 in the liquid crystal display panel.

In some embodiments, in a case where the number of the auxiliary spacers 103b is plural, as shown in FIG. 7, every two auxiliary spacers 103b disposed on opposite sides of a main spacer 103a are on the same straight line as the center of the main spacer 103a.

As shown in FIG. 7, in a case where two auxiliary spacers 103b are disposed around the same main spacer 103a, the two auxiliary spacers 103b may be disposed along an extension direction of a gate line, and respectively disposed on the left and right sides of the main spacer 103a; alternatively, the two auxiliary spacers 103b may be disposed along an extension direction of a data line, and respectively disposed on the upper and lower sides of the main spacer 103a, and every two auxiliary spacers 103b disposed on opposite sides of the main spacer 103a are on the same straight line as the center of the main spacer 103a. Certainly, four auxiliary spacers 103b may be further disposed around the same main spacer 103a, two of the four auxiliary spacers 103b may be disposed along the extension direction of the gate line and respectively disposed on the left and right sides of the main spacer 103a, and the other two auxiliary spacers 103b may be disposed along the extension direction of the data line and respectively disposed on the upper and lower sides of the main spacer 103a. It is understood that other numbers of auxiliary spacers 103b may be disposed around the same main spacer 103, and the implementation principle thereof is similar to that described above and is not listed here. When the liquid crystal display panel is subjected to an external force and is misaligned, the auxiliary spacer 103b can limit the main spacer 103a in a linear direction, for example, the extension direction of the gate line or extension direction of the data line, so as to prevent the main spacer 103a from moving along the extension direction of the gate line or the extension direction of the data line, prevent the main spacer 103a from sliding off the pillow 104 to the display region, and prevent the main spacer 103a from scratching the display components in the display region to cause poor display such as light leakage. As such, a large number of light-shielding layers 106 are not required to shield the main spacers 103a, and thus the aperture ratio of pixels in the liquid crystal display panel can be improved, thereby improving the display effect. Meanwhile, the main spacer 103a may be defined in the region enclosed by the auxiliary spacers 103b, so as to prevent the main spacer 103a from sliding off the pillow 104, which can ensure that the main spacer 103a has a large support area, and that the main spacer 103a has a good support performance, so as to ensure the cell gap of the liquid crystal layer 105 in the liquid crystal display panel.

In some embodiments, as shown in FIGS. 7 to 9, an area of the orthographic projection of the auxiliary spacer 103b on the first substrate 101 is smaller than that of the main spacer 103a on the first substrate 101.

The auxiliary spacer 103b does not function as a support, and the area of the orthographic projection of the auxiliary spacer 103b on the first substrate 101 is smaller than that of the main spacer 103a, it's only required to ensure that the height of the auxiliary spacer 103b is greater than that of the main spacer 103b. In this way, the area occupied by the auxiliary spacer 103b can be reduced, and a large area of light-shielding layers 106 are not required to shield the auxiliary spacer, and thus the aperture ratio of pixels in the liquid crystal display panel can be improved, thereby improving the display effect. Meanwhile, the main spacer 103a has a larger area of the orthographic projection on the first substrate 101 than the auxiliary spacer 103b, which can ensure that the main spacer 103a has a larger support area, so that the main spacer 103a has a good support performance to ensure the cell gap of the liquid crystal layer 105 in the liquid crystal display panel.

In some embodiments, an arrangement density of the auxiliary spacers 103b is smaller than or equal to an arrangement density of the main spacers 103a.

It should be noted that, each certain number of pixel units correspond to one main spacer 103a in the entire liquid crystal display panel, and the reciprocal of the certain number represents the arrangement density of the main spacers 103a. Meanwhile, each certain number of pixel units correspond to one main spacer 103a around which the auxiliary spacers 103b is arranged in the entire liquid crystal display panel and the reciprocal of the certain number is the arrangement density of the auxiliary spacers 103b. For example, in the liquid crystal display panel, one main spacer 103a is disposed corresponding to every 21.4 pixel units, the arrangement density of the main spacers is 1/21.4, and the arrangement density of the auxiliary spacers 103b may be set to 1/21.4, 1/34, or 1/64.5. In a case where the arrangement density of the main spacers 103a is equal to that of the auxiliary spacers 103b, it means that each main spacer 103a has the auxiliary spacers 103b disposed around, and when the arrangement density of the main spacers 103a is smaller than that of the auxiliary spacers 103b, it means that only a portion of the main spacers 103a has the auxiliary spacers 103b disposed around. The support performance and the aperture ratio of the pixel units are shown in FIG. 10a and FIG. 10b, and it can be seen that, in a case of the arrangement density shown in FIG. 10a, the aperture ratio of each pixel unit may reach 40.34%, which can meet the requirement of the liquid crystal display panel for realizing a good display effect. Meanwhile, as shown in FIG. 10b, when the liquid crystal display panel is misaligned by 2 microns under an external force, the support area of the main spacer 103a may still be kept above 70% of the original support area, which may have the effective support function on the array substrate and the color filter substrate, so as to ensure the cell gap of the liquid crystal layer 105 in the liquid crystal display panel.

In some embodiments, as shown in FIG. 8, the first substrate 101 includes a first base 1011. The liquid crystal display panel further includes a light-shielding layer 106 on the first base 1011. The orthographic projections of the main spacers 103a and the auxiliary spacers 103b on the first base 1011 all fall within the orthographic projection of the light-shielding layer 106 on the first base 1011.

The first base 1011 may be made of a rigid material such as glass, which can improve the carrying capacity of the first base 1011 to other film layers thereon. Certainly, the first base 1011 may also be made of a flexible material such as polyimide (PI), which can improve the bending resistance and the tensile resistance of the entire first substrate 101, and prevent the first base 1011 from being broken to cause poor open circuit due to the stress generated during bending, stretching or twisting. In practical applications, the material of the first base 1011 may be selected according to practical requirements to ensure that the first substrate 101 has good performance.

The light-shielding layer 106 may be made of at least one of gold (Au), silver (Ag), copper (Cu), nickel (Ni), platinum (Pt), palladium (Pd), aluminum (Al), molybdenum (Mo), and chromium (Cr), and may be formed as a single-layer structure made of a single material. For example, the light-shielding layer 106 may be a single-layer structure made of aluminum (Al), or may be formed as a multi-layer structure made of multiple different materials, for example, a three-layer structure made of molybdenum (Mo), aluminum (Al), and molybdenum (Mo).

An area of the light-shielding layer 106 is larger than a sum of an area of the main spacer 103a and an area of the auxiliary spacer 103b around the main spacer 103a, and the light-shielding layer 106 may shield the main spacer 103a and the auxiliary spacer 103b to prevent the backlight entering from the first base 1011 from transmitting through the main spacer 103a and the auxiliary spacers 103b, thereby avoiding poor display such as light leakage.

In some embodiments, as shown in FIG. 8, the first substrate 101 further includes: a driving circuit layer 1012, a planarization layer 1013, and a pixel electrode 1014 which are sequentially disposed on a side of the light-shielding layer 106 away from the first base 1011; the pixel electrode 1014 is electrically coupled to the driving circuit layer 1012 through a via hole penetrating through the planarization layer 1013; the planarization layer 1013 is provided with a recess formed in the via hole, and the pillow 104 is embedded into the recess.

The driving circuit layer 1012 may have a pixel circuit for transferring a driving signal which is configured to drive the liquid crystal in the liquid crystal layer 105 to deflect, and the pixel circuit may be arranged according to a conventional circuit arrangement manner, which is not described here.

The planarization layer 1013 may be made of an organic material such as acryl, resin, polyimide, or benzocyclobutene. Planarization may be performed on a surface of the driving circuit layer 1012 by the planarization layer 1013 to provide a smooth surface for other layers on the driving circuit layer 1012, so as to improve the adhesion between the other layers and the driving circuit layer 1012.

The pixel electrode 1014 may be made of a transparent conductive material such as Indium Tin Oxide (ITO) to prevent the pixel electrode 1014 from shielding light and improve the overall light transmittance of the liquid crystal display panel. The pixel electrode 1014 may be electrically coupled to the driving circuit layer 1012 through the via hole penetrating through the planarization layer 1013, and the planarization layer 1013 is formed with a recess at the via hole. The pillow 104 may be embedded into the recess, which can not only reduce the thickness of the entire liquid crystal display panel, but also provide a stable space for the pillow 104, and prevent the pillow 104 from sliding.

In some embodiments, the driving circuit layer 1012 includes: a plurality of thin film transistors, each thin film transistor includes: a semiconductor layer P—Si, an orthographic projection of the semiconductor layer P—Si on the first base 1011 falls within the orthographic projection of the light-shielding layer 106 on the first base 1011.

The light-shielding layer 106 may shield the semiconductor layer P—Si of the thin film transistor, and prevent the backlight entering from the first base 1011 from affecting the semiconductor layer P—Si, thereby improving the stability of the thin film transistor.

In some embodiments, the first substrate 101 further includes: a passivation layer 1015 and a common electrode 1016 which are sequentially disposed on a side of the pixel electrode 1014 away from the first base 1011, the common electrode 1016 has a plurality of slits; and an orthographic projection of the common electrode 1016 on the first base 1011 at least partially overlaps with an orthographic projection of the pixel electrode 1014 on the first base 1011.

The passivation layer 1015 may be made of at least one of silicon nitride (SiN) and silicon oxide (SiO$_2$), and may form as a single-layer structure made of a single material or a multi-layer structure made of a plurality of different materials.

The common electrode 1016 may be made of a transparent conductive material such as Indium Tin Oxide (ITO), so as to prevent the common electrode 1016 from shielding light, thereby improving the overall light transmittance of the liquid crystal display panel.

The pixel electrode 1014 may transfer a data signal, and the common electrode 1016a may transfer a common signal. A driving electric field is formed between the pixel electrode 1014 and the common electrode 1016 at the slit of the common electrode 1016 to drive the liquid crystal in the liquid crystal layer 105 to deflect, so that the backlight is transmitted through the liquid crystal layer 105, and the display function is realized.

In some embodiments, as shown in FIG. 8, the second substrate 102 includes: a second base 1021 and a black matrix 1022 disposed on a side of the second base 1021 close to the first base 1011, and orthographic projections of the main spacer 103a and the auxiliary spacer 103b on the second base 1021 each fall within an orthographic projection of the black matrix 1022 on the second base 1021.

The second base 1021 may be made of a rigid material such as glass, which can improve the carrying capacity of the second base 1021 to other films thereon. Certainly, the second base 1021 may also be made of a flexible material such as polyimide (PI), which can improve the bending resistance and the tensile resistance of the entire second substrate 1021, and prevent the second base 1021 from being broken to cause poor open circuit due to the stress generated during the bending, stretching or twisting. In practical applications, the material of the second base 1021 may be selected according to practical requirements to ensure that the second substrate 102 has good performance.

The black matrix 1022 may prevent light of different colors from mixing to improve the display effect of the liquid crystal display panel. Meanwhile, the black matrix 1022 may shield the main spacer 103a and the auxiliary spacer 103b, so as to prevent light from leaking through the main spacer 103a and the auxiliary spacer 103b and from entering the field of view of a user, thereby further improving the display effect of the liquid crystal display panel.

In some embodiments, a distance between an edge of the black matrix 1022 and an edge of the auxiliary spacer 103b is greater than or equal to 0.9 μm.

An area of the black matrix 1022 is greater than the areas of the main spacer 103a and the auxiliary spacer 103b. Specifically, the distance between the edge of the black matrix 1022 and the edge of the auxiliary spacer 103b may be set to be greater than or equal to 0.9 μm, so as to ensure that the black matrix 1022 can completely shield the main spacer 103a and the auxiliary spacer 103b, and prevent light from leaking through the main spacer 103a and the auxiliary spacer 103*b* and from entering the field of view of a user, thereby further improving the display effect of the liquid crystal display panel.

In some embodiments, the cross-sectional shape of the main spacer 103*a* in a direction perpendicular to the second base 1021 is a rectangular or trapezoidal shape.

In order to meet the requirement of a high-resolution liquid crystal display panel, generally, the cross section of the spacer 103 have a semicircular or elliptical shape, but in this case, the area of the top surface of the spacer which abuts against (or contacts with) the pillow 104 is small, which affects the support performance. In the embodiments of the present disclosure, the cross-sectional shape of the main spacer 103*a* in a direction perpendicular to the second base 1021 may be set to be rectangular or trapezoidal by an improved process to ensure that the main spacer 103*a* has a large support area, so that the main spacer 103*a* has a good support performance to ensure the cell gap of the liquid crystal layer 105 in the liquid crystal display panel. Specifically, the main spacer 103*a* has a slope angle in a range from 60 to 90 degrees, and the slope angle represents an included angle between the side surface of the main spacer 103*a* and of the second base 1021. In practical applications, the slope angle of the main spacer 103*a* is as close to 90 degrees as possible to further increase the support area of the main spacer 103*a*.

In some embodiments, the cross-sectional shape of the pillow 104 along a direction perpendicular to the first base 1011 is rectangular or trapezoidal.

Since the cross-sectional shape of the pillow 104 along the direction perpendicular to the first base 1011 is rectangular or trapezoidal, corresponding to the main spacer 103*a*, the pillow 104 may also have a larger support area, so that the pillow 104 also has a good support performance to ensure the cell gap of the liquid crystal layer 105 in the liquid crystal display panel. Specifically, a slope angle of the pillow 104 is in a range from 90 degrees to 100 degrees, and the slope angle represents an included angle between a side surface of the pillow 104 and the first base 1011. In practical applications, the slope angle of the pillow 104 is as large as 90 degrees as possible, so as to further increase the support area of the main spacer 103*a*.

In some embodiments, an elastic recovery rate of the main spacer 103*a* is greater than or equal to 45%.

The main spacer 103*a* may be made of an organic material having a specific elasticity, with the elastic recovery rate greater than or equal to 45%. When the liquid crystal display panel is subjected to an external force, the main spacer 103*a* is compressed, and when the external force disappears, the main spacer 103*a* may recover to the original shape as much as possible, so that the cell gap of the liquid crystal layer 105 in the liquid crystal display panel can be ensured.

In a second aspect, embodiments of the present disclosure provide a display apparatus including the liquid crystal display panel according to any one of the above embodiments. Specifically, the display apparatus may be a virtual reality display apparatus or an augmented reality display apparatus, and the resolution of the display apparatus is greater than or equal to 2000 PPI, so as to implement high-resolution display and meet the user's requirement for a high-resolution display image. It should be noted that the implementation principle and the beneficial effects of the display apparatus according to the embodiments of the present disclosure are the same as those of the liquid crystal display panel according to any one of the embodiments described above, and are not described here.

It is to be understood that the above embodiments are merely exemplary embodiments adopted to illustrate the principles of the present disclosure, but the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. A liquid crystal display panel, comprising: a first substrate and a second substrate assembled to form a cell, a plurality of main spacers between the first substrate and the second substrate, and an auxiliary spacer around at least a portion of the plurality of main spacers,
   wherein a height of the auxiliary spacer is greater than or equal to a height of each of the plurality of main spacers,
   the liquid crystal display panel further comprises: pillows on a side of the first substrate close to the second substrate and each abutting against a corresponding one of the plurality of main spacers, and
   an orthographic projection of the main spacer on the first substrate falls within an orthographic projection of a corresponding pillow on the first substrate, and an orthographic projection of the auxiliary spacer on the first substrate does not overlap with the orthographic projection of the pillow on the first substrate,
   wherein the first substrate comprises a first base, and the liquid crystal display panel further comprises a light-shielding layer on the first base; and
   orthographic projections of both the main spacer and the auxiliary spacer on the first base fall within an orthographic projection of the light-shielding layer on the first base,
   wherein the first substrate further comprises a driving circuit layer, a planarization layer and a pixel electrode sequentially disposed on a side of the light-shielding layer away from the first base;
   the pixel electrode is electrically coupled to the driving circuit layer through a via hole penetrating through the planarization layer; and
   the planarization layer is provided with a recess formed in the via hole, and the pillow is embedded in the recess.

2. The liquid crystal display panel of claim 1, wherein a distance between an edge of the auxiliary spacer and an edge of the pillow is smaller than or equal to a distance between an edge of the main spacer and the edge of the pillow.

3. The liquid crystal display panel of claim 1, wherein the liquid crystal display panel comprises a plurality of auxiliary spacers, and every two of the plurality of auxiliary spacers are on opposite sides of the main spacer and on a same straight line as a center of the main spacer.

4. The liquid crystal display panel of claim 1, wherein an area of the orthographic projection of the auxiliary spacer on the first substrate is smaller than an area of the orthographic projection of the main spacer on the first substrate.

5. The liquid crystal display panel of claim 1, wherein an arrangement density of the auxiliary spacer is smaller than or equal to an arrangement density of the plurality of main spacers.

6. The liquid crystal display panel of claim 1, wherein the driving circuit layer comprises a plurality of thin film transistors;
   the thin film transistor comprises a semiconductor layer; and an orthographic projection of the semiconductor layer on the first base falls within the orthographic projection of the light-shielding layer on the first base.

7. The liquid crystal display panel of claim 1, wherein the first substrate further comprises: a passivation layer and a common electrode sequentially disposed on a side of the pixel electrode away from the first base;

the common electrode has a plurality of slits; and an orthographic projection of the common electrode on the first base at least partially overlaps with an orthographic projection of the pixel electrode on the first base.

8. The liquid crystal display panel of claim 1, wherein the second substrate comprises: a second base and a black matrix on a side of the second base close to the first substrate; and orthographic projections of both the main spacer and the auxiliary spacer on the second base fall within an orthographic projection of the black matrix on the second base.

9. The liquid crystal display panel of claim 8, wherein a distance between an edge of the black matrix and an edge of the auxiliary spacer is greater than or equal to 0.9 μm.

10. The liquid crystal display panel of claim 1, wherein a cross-section of the main spacer along a direction perpendicular to the second substrate has a rectangular or trapezoidal shape.

11. The liquid crystal display panel of claim 10, wherein the main spacer has a slope angle in a range from 60 to 90 degrees.

12. The liquid crystal display panel of claim 1, wherein a cross-section of the pillow in a direction perpendicular to the first substrate has a rectangle or a trapezoid shape.

13. The liquid crystal display panel of claim 12, wherein the pillow has a slope angle in a range from 90 to 100 degrees.

14. The liquid crystal display panel of claim 1, wherein the main spacer has an elastic recovery rate of 45% or more.

15. A display apparatus, comprising the liquid crystal display panel of claim 1.

16. The display apparatus of claim 15, wherein the display apparatus is an augmented reality display apparatus or a virtual reality display apparatus.

17. The display apparatus of claim 16, wherein a pixel resolution of the augmented reality display apparatus or the virtual reality display apparatus is greater than or equal to 2000 PPI.

* * * * *